United States Patent Office 3,559,434
Patented Feb. 2, 1971

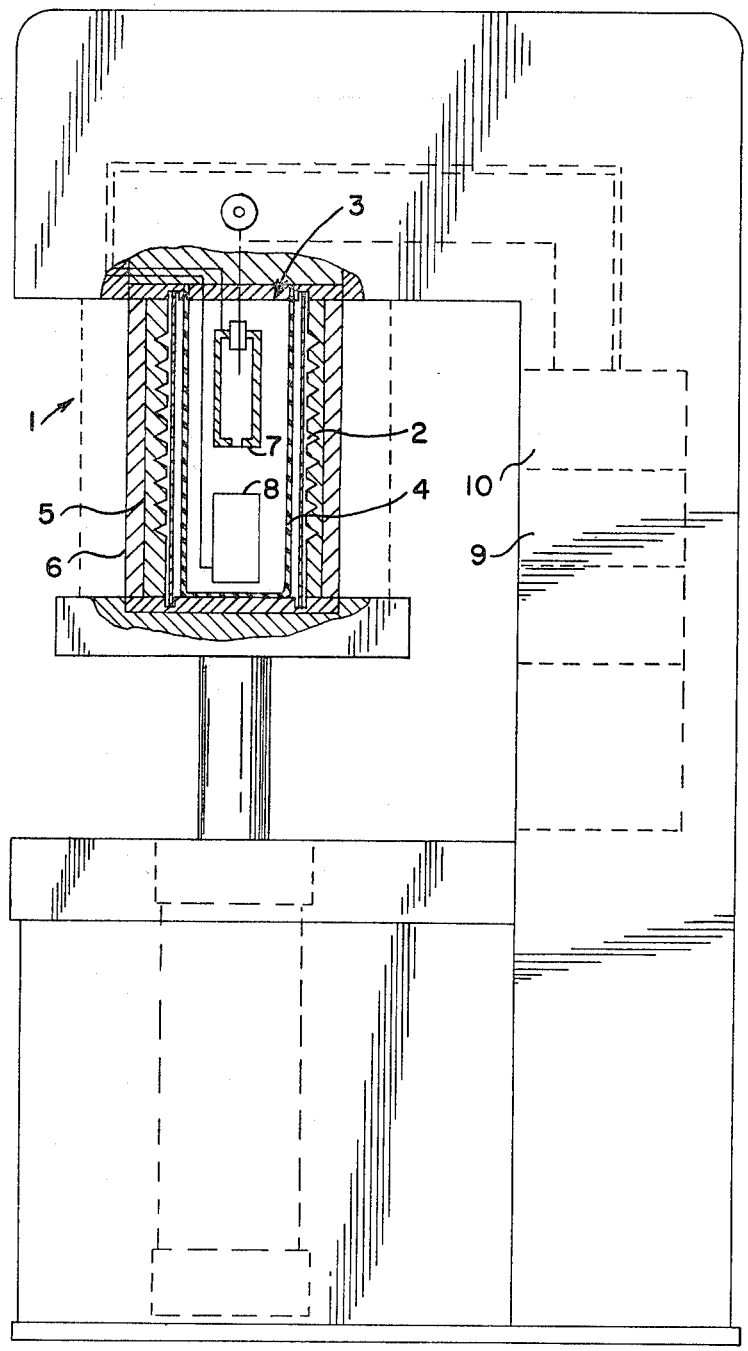

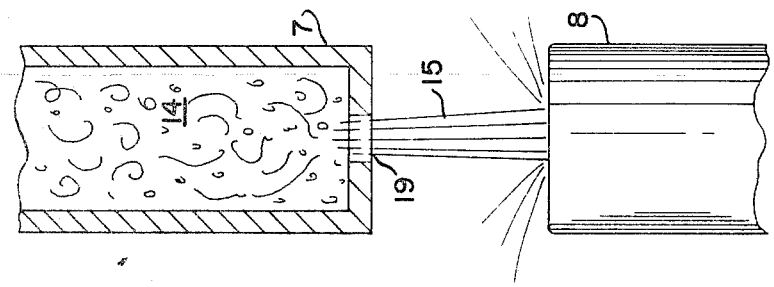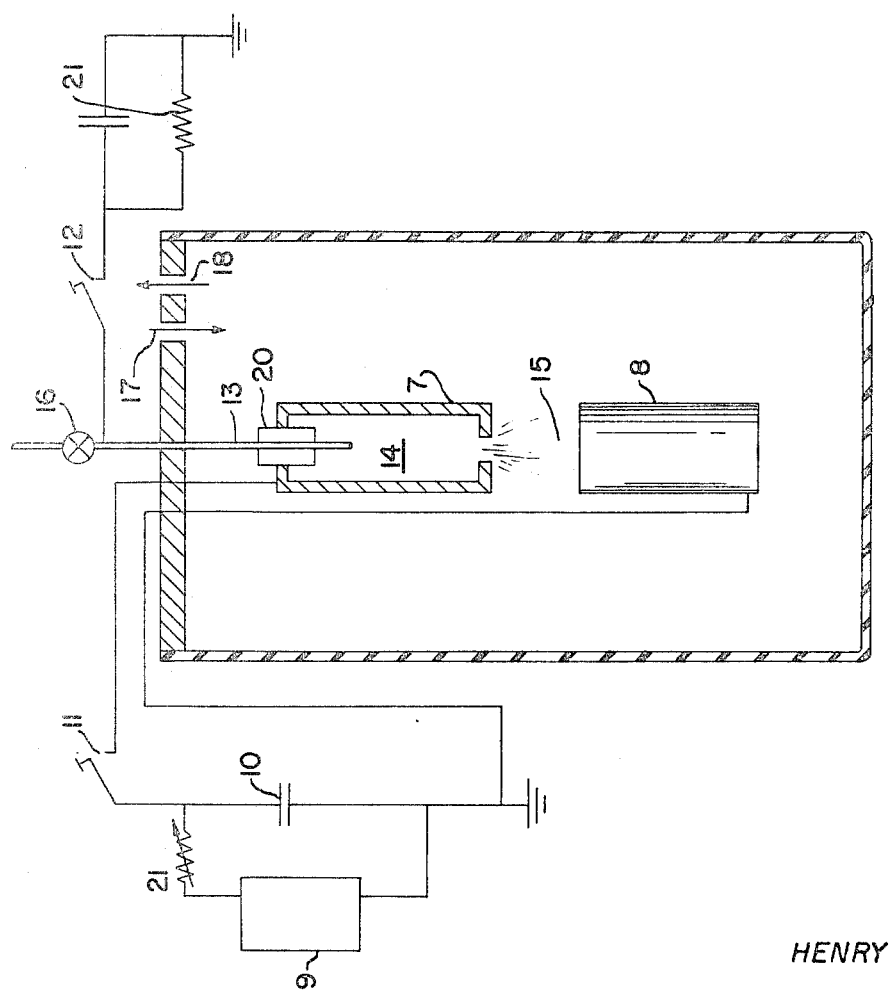

3,559,434
CONDUCTIVE EXPLOSIVE GAS TRIGGER FOR ELECTROHYDRAULIC FORMING
Henry J. Keinanen, Hickory Hills, Ill., assignor to Continental Can Company, Inc., New York, N.Y., a corporation of New York
Filed Sept. 25, 1968, Ser. No. 762,456
Int. Cl. B21d 26/14
U.S. Cl. 72—56         12 Claims

ABSTRACT OF THE DISCLOSURE

A device for the generation of an ionized conductive gas pathway between two electrodes. A combustible gas is collected at one electrode where it is ignited. On ignition the gas jets toward the other electrode to form an ionized conductive pathway between the two electrodes and an electrical impulse is conducted by this pathway to give rise to an explosion which may be used for forming a sheet of metal.

---

My invention relates to electrohydraulic forming and more particularly to repeated electrohydraulic forming by conduction of an electric impulse across a gaseous preferential pathway to give rise to a shaped wave of predictable strength.

Up to this time the principal means of forming a preferential pathway for an electrohydraulic impulse has been by means of a bridge wire. A disadvantage of bridge wire conduction is that the wire is destroyed each time an electrohydraulic impulse is generated by passing a large current through the wire. Also after the impulse is generated contaminates are found in the surrounding liquid and another wire must be inserted between the electrodes before another impulse can be generated. The time between successive impulses must necessarily be large because the bridge wire must be replaced each time that a large electric current is passed through it.

It is an object of my invention to provide a preferential conductive path between electrodes to generate a uniform shock impulse.

It is another object of my invention to provide an automatic repetitive explosion using a renewable gaseous preferential conductive medium.

It is another object of my invention to provide an easily renewable bridge to allow rapid repetitive firing of an electrohydraulic system.

In brief, my invention is an apparatus and method for providing an ionized gas to form a preferentially conductive path for conducting a high voltage pulse to generate an arc and give off a pressure wave. The bridge is developed by filling a hollow electrode with combustible gas. The hollow electrode has a hole in it and when the gas is ignited an ionized gas jets through the hole toward another electrode to form a conductive bridge for a short time.

Other objects and advantages of the present improved apparatus will become apparent during the following discussion of the drawing, wherein:

FIG. 1 is a pictorial view showing my invention used to generate an explosive impulse to form blank tubular stock material.

FIG. 2 is a diagram schematically illustrating an embodiment of my present invention.

FIG. 3 is a diagram showing an apparatus injecting a conductive fluid between the electrodes.

The overall pictorial shown in FIG. 1 illustrates a die assembly 1 which is designed for "stylizing" or expansion forming of a tubular member 2 such as a partially formed can which is to be "stylized" and with some design or shaped formed into the can. This gives the can pleasing lines, rich texturing and detailed embossing. The device 3 used in forming may be an elastomeric boot 4 surrounded by a pair of vertically split die halves 5 carried upon a pair of complementary die holders or the die may be integral as best suits the operation at hand. Inserts 6 are provided for a snug fit with each of the die holders so that the die halves may be placed within the inserts and the explosion generated within the confines of the die halves causes the can or other blank stock material to form a particular configuration against the inside of the die. After the can has been formed, the die and die holder are separated to allow the formed can to be moved out and another blank can be moved into position for forming.

Since my invention is adapted to be operated at high speed and generate many explosive impulses per second the associated mechanical equipment is also designed for high speed operation.

In order to generate sufficient impact to form metal against a die a high voltage and current is necessarily applied across the electrodes 7, 8 for a brief span of time to create high momentary energy. This high voltage and current may be developed by a circuit such as shown in FIG. 2 where the electrical source 9 typically has a large storage capacitor 10. A triggering switch 11 is provided in series with the electrical source and the electrode gap to allow quick release of electrical energy. A second switch 12 is connected between ground and the gas supplying tube 13. As shown in this embodiment the electrical energy is released at about the time that combustible gas is present in sufficient quantities in space 14 of the hollow electrode 7 to be ignited and form an ionized gaseous bridge 15 between the electrodes. In manual operation of this device sufficient combustible gas must be present in the electrode chamber 14, electric potential must be applied across the electrodes, then the electrical switch 12 is closed and a spark arcing between tube 13 and electrode 7 ignites the combustible gas turning it into a hot ionized gas. The ionized gas jets out of the electrode chamber striking the other electrode 8 and forming a bridge to allow a heavy surge of electricity from the storage capacitor. In manual operation, the switch is then opened and the cycle is repeated.

The switches may be closed in a different order to produce the same result if one desires.

As described above, ionized gas is provided to form a preferential pathway between the electrodes, and a valve 16 in series with the gas source and the tube may be opened periodically to allow a flow of ignitable gas into the hollow electrode 7 followed by ignition of this gas by some means and the jetting of ionized gas across the electrode gap. The ionized flow may be synchronized with closing of the high voltage electric trigger 11 so that a brief forming impulse is given out when the gas is ignited and the large current arcs across the electrodes.

It is noted that as possible variants of any device the electrical triggers can be eliminated and valving of the pressurized ionized gas used to develop an electrical on-off switch across the electrodes if one so desired. The gas may be introduced into the hollow electrode by insulated tubes extending through the side of the electrode near its bottom so that the ignition spark does not fire until the electrode is filled with combustible gas.

In some applications of my device the electrodes are laterally spaced from each other. In this arrangement the hole in the hollow electrode is located in the bottom of the wall which faces the other electrode to avoid leakage of combustible gas until the hollow electrode is filled.

In any case, after the ionized gas streams from one electrode to the other, application of sufficient electrical potential across the electrodes causes an electric arc to generate a pressure wave to form a sheet metal by an explosive impact. This electric arc is of about the same intensity each time and causes a wave of uniform shape and energy distribution to form on a repetitive basis. The speed of operation of this circuit is limited by the time constants of the storage capacitor in the electrical source, if such capacitor is used.

One way of generating an ionized gaseous material is shown in FIGS. 2 and 3 wherein a combustible gas such as a mixture of $H_2$ and $O_2$ is injected into cavity 14 through a small tube 13. After the gas is injected into the cavity to such an extent that the cavity is filled with gas, switch 12 is closed and the high voltage electric switch 11 is now closed and a high electrical potential is put across the hollow metal electrode and the ground electrode. This potential is sufficient to cause an arc across the space between the side of the hollow electrode 7 and the small metal tube 13 through which gas has been injected. This arc causes an explosion or at least very rapid burning of gas within the compartment 14. When this gas is ignited it jets out from the top electrode 7 through the hole at the end of the electrode producing an ionized conductive path 15 between the electrodes. This conductive path 15 has the same essential characteristics as the bridge wire referred to earlier in this disclosure. The high potential between the electrodes now discharges across the conductive path and produces an electrohydraulic impulse or shock wave sufficient to form the metal sheeting against the inside of the die. By the use of water gas made of $H_2$ and $O_2$ a "clean" residue is left. The water produced by the reaction mixes with the distilled water inside of flexible bag 4. It is not necessary to shut down operation of the machine for cleaning or replacement of parts. The rate of feed of the combustible gas into the chamber is regulated in accordance with the speed of operation of the device.

As pointed out above water gas has a particular advantage in that the residue is a very small amount of water which mixes with the other water in the system. The water in the flexible bag is circulated between slots through ports 17, 18 in the compartment to provide cooling and to flush away erosion products. In this way fresh water is provided for each cycle of the machine.

In the embodiment shown the upper electrode 7 is made hollow to form a chamber and has a hole 19 in its lower side. Combustible gas is conducted into the top of the chamber through a metal tube 13. The tube is insulated by a plug 20 from the hollow electrode and it is connected to ground through a capacitor-resistor network 21. When switch 11 between main capacitor 10 and hollow electrode 7 is closed the electrical potential at the hollow electrode rises rapidly. When the potential difference between the tube 13 and electrode 7 exceeds the gap break-down voltage a small arc jumps from the inner shell wall to the gas tube. If gas substantially fills the upper chamber it is ignited by the spark passing between the hollow needle and the inner shell wall of the upper electrode. High pressure is developed in the chamber and the gas is forced out through the hole 19 in the chamber and jets in its ionized conductive state down to the lower electrode. The ionized gas bridge 15 (FIGS. 2 and 3) passes directly from the hollow electrode to the lower electrode. The electric current follows the bridge to form an arc in a relatively straight line between the electrodes. The shape of the shock wave is determined by the shape of the electric arc which produces the shock wave. Successive electrical impulses passing through successive bridges form electric arcs each time the bridge is formed it is formed in a relatively straight line causing each shock wave to be of a similar shape.

The gas ignition spark formed by closing switch 12 is of sufficient magnitude to ignite the gas but does not substantially deplete the charge of capacitor 10. At the time the gas is ignited the potential difference between the electrodes 7, 8 is sufficiently high to cause an electric arc to pass between them across the newly formed bridge and give an electrohydraulic pressure pulse each time the arc is formed. This voltage is not sufficient to jump the gap between the upper and the lower electrode through the relatively non-conductive distilled water located therebetween but does arc from the upper electrode to the lower electrode across the low resistance of the conductive ionic bridge. Because of this characteristic, switching of the electric current may be obtained by firing the conductive gas across the inter-electrode gap to form a preferentially conductive pathway through the water. Just before firing, the potential on the storage capacitor is large and is about the same from spark discharge to spark discharge so that the force of the pressure wave is about the same in successive pressure waves. As the capacitor empties itself the arc subsides and the combustible gas continues feeding through metallic tube 13 into the hollow electrode and builds up for another cycle.

By proper adjustment of the rate of filling the electrode compartment with combustible gas and of the rate of build up of the electric charge on the storage capacitor, automatic operation of the device may be secured. When this happens the hollow electrode 7 fills with combustible gas at about the same time that the voltage across the electrode tube gap is sufficient to cause a small arc across this gap. The combustible gas is ignited and forms a preferential conductive bridge between the two electrodes. The capacitor then empties across the electrodes and the system is ready to start the cycle again. The frequency of the electrohydraulic impulse may be varied by adjusting the rate of build up of the storage capacitors. In the embodiment shown the rate of buildup may be adjusted by varying the value of resistor 21 and the rate at which gas flows into the hollow electrode may be adjusted by varying the valve opening. Thus automatic operation at a variety of speeds may be provided depending on the feed rate, forming machine speed and any other limiting factors. In automatic operation the high voltage switch 11 may be used to stop and start the machine.

By way of example, if a firing rate of 250 cycles per minute is desired then assuming a voltage of 15,000 volts, a capacitor having a value of 30 F. resistance of 8,000 and charge time of about 240 microseconds. About 15 millimeters of ignitable gas must be in the hollow electrode to give a bridge through water. Thus for 250 bridges per minute a rate of flow of about 3.75 liters per minute is needed.

It is noted that for various speeds and different operating conditions different values may be used.

As an alternative the arc current may be fed from a bank of capacitors selected for firing one-at-a-time.

One of the advantages of my apparatus is increased efficiency due to pre-ionization of the electrode gap.

Another advantage of my apparatus is that the bridge is easily and rapidly renewable on a periodic basis without teardown of the machine.

Another advantage is that the combustible gas is generated at the rate of use i.e. the apparatus is safe and leaves no contamination in the water if a clean gas such as water gas ($H_2$ and $O_2$) is used.

A final advantage of my apparatus is that the mode of operation is simple and requires little maintenance.

While the embodiment under consideration shows the use of electrohydraulic impact in can forming, it is realized that this invention may be used in any situation where a sharp impact is needed.

The foregoing is a description of an illustrative embodiment of the invention and it is applicant's intention in the appended claims to cover all forms which fall within the scope of the invention.

I claim:
1. An electrohydraulic forming system comprising:
an electrical energy storage means,
a first electrode,
a second electrode having a cavity therein and having a small passage leading from said cavity to one end of said electrode, tube means connected to said electrode cavity and projecting into said cavity for filling said electrode cavity with a combustible fluid when an electric arc is formed between the wall of said cavity and said tube to ignite said combustible fluid whereby an ionized fluid jets out of said small passage to bridge the space between said electrodes, and means electrically connecting said energy storage means to said first and second electrodes whereby an electrical potential may be applied across said electrodes and an arc formed to discharge said electrical energy storage means and produce a pressure wave.

2. An electrohydraulic forming system as set forth in claim 1 additionally comprising:

means for applying voltage between said tube means and the wall of said cavity to ignite said combustible fluid.

3. An electrohydraulic forming system as set forth in claim 2 in which said tubular means comprises:

a conduit made of electrically conductive material.

4. An electrohydraulic forming system as set forth in claim 3 in which;

said combustible gas in said electrode cavity has the same chemical constituents as the liquid surrounding said electrodes.

5. An electrohydraulic forming system as set forth in claim 4 in which;

the constituents of said combustible gas bear to each other the same ratio as the same constituents of the liquid surrounding said electrodes.

6. An electrohydraulic forming system as set forth in claim 3 in which said voltage applying means comprises:

a source of electric potential electrically connected to said second electrode, and a source of ground potential electrically connected to said tube means.

7. An electrohydraulic forming system as set forth in claim 6 in which;

an elastomeric bag surrounds and supports said liquid.

8. An electrohydraulic forming system as set forth in claim 6 in which said tube means comprises:

a tube extending through the wall of said cavity and having one end extending into said chamber and its other end connected to a source of combustible gas and a means for controlling the rate of flow of said combustible gas to regulate the rate at which said combustible gas is introduced into said electrode cavity to fill said electrode cavity.

9. An electrohydraulic forming system as set forth in claim 8 in which;

said electrical energy storage means comprises, an electric capacitor, and means for controlling the rate of charge of said electrical storage means to be synchronized with said gas flow rate controlling means to reach an electric potential across said electrode tube gap to cause ignition of said combustible gas at the same time that said hollow tube is filled with combustible gas.

10. An electrohydraulic forming system as set forth in claim 9 in which;

an elastomeric bag surrounds and supports said liquid whereby the pressure wave in said liquid is transmitted to the wall of said elastomeric bag and thence to a metal plate to form said plate into the interstices of a die.

11. A method of forming metal comprising the steps of:

placing two electrodes in a liquid medium, introducing combustible gas into a hollowed part of one electrode through a tube, applying an electric potential between said electrodes, applying an increasing electric potential between the inside of the hollowed part of said electrode and said tube thereby causing an igniting spark to jump between said tube and the inside of said hollowed part of said electrode whereby said combustible gas is ignited and jets between said electrodes, to form a preferential pathway, and passing a large electric current between said electrodes over the preferential pathway between said electrodes to form an electric arc between said electrodes whereby a pressure wave forms a metal against a die.

12. A method of forming metal as set forth in claim 11 with the additional steps of:

adjusting the rate at which said combustible gas is introduced into said hollow electrode, and adjusting the rate at which said electrical potential increases until said combustible gas fills said hollow electrode at the same time as said electrical potential becomes high enough to arc between said electrode and said tube and cause ignition of said combustible gas to form a conductive bridge between said electrodes on an automatic repetitive basis.

References Cited

UNITED STATES PATENTS

| 3,200,626 | 8/1965 | Callender | 72—56 |
| 3,232,085 | 2/1966 | Inove | 72—56 |
| 3,253,442 | 5/1966 | Grove Jr. et al. | 72—56 |
| 3,456,291 | 7/1969 | Balcar et al. | 72—56 |

RICHARD J. HERBST, Primary Examiner

U.S. Cl. X.R.

29—421